C. H. TURBETT.
LOCK BOLT.
APPLICATION FILED MAY 10, 1917.
1,263,489.
Patented Apr. 23, 1918.
2 SHEETS—SHEET 1.
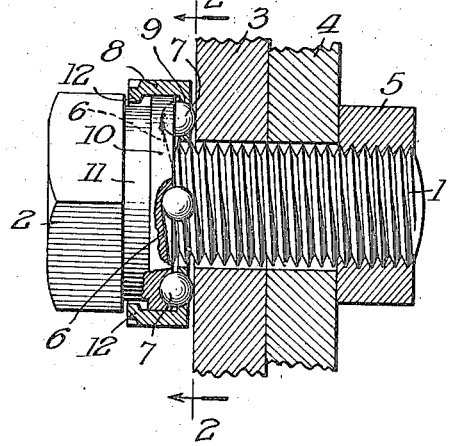
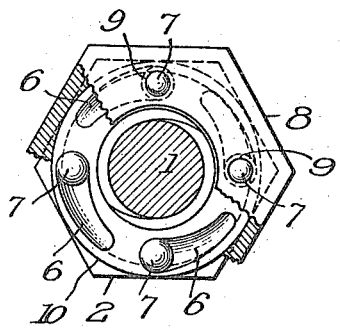
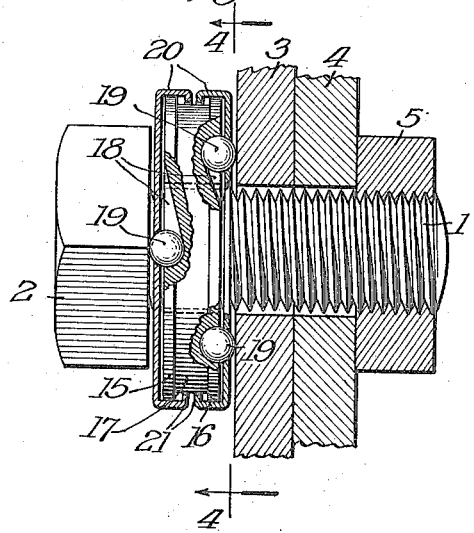
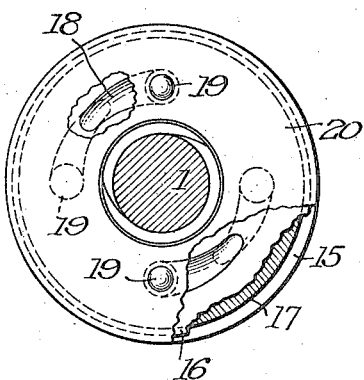
INVENTOR.
Charles H. Turbett
BY Cheever & Cox
ATTORNEYS.

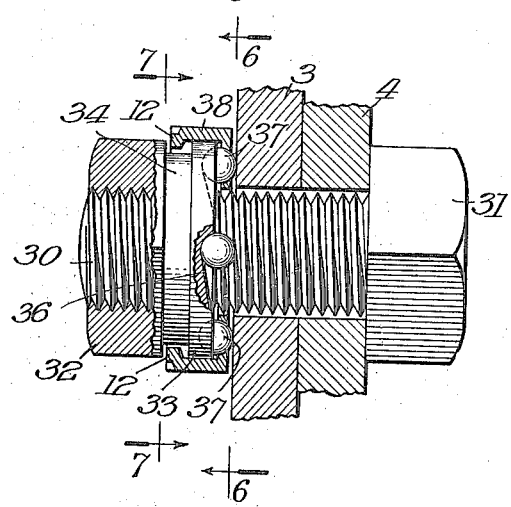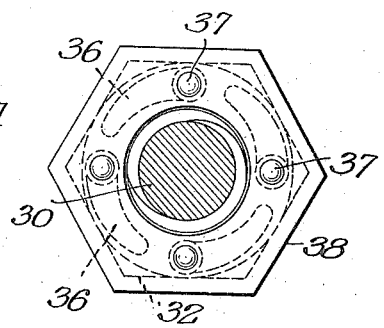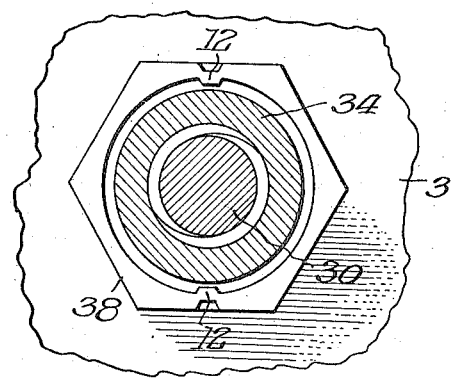

500
UNITED STATES PATENT OFFICE.

CHARLES H. TURBETT, OF CHICAGO, ILLINOIS.

LOCK-BOLT.

1,263,489. Specification of Letters Patent. Patented Apr. 23, 1918.

Application filed May 10, 1917. Serial No. 167,812.

*To all whom it may concern:*

Be it known that I, CHARLES H. TURBETT, a citizen of the United States, residing at Chicago, in the county of Cook and State of Illinois, have invented a certain new and useful Improvement in Lock-Bolts, of which the following is a specification.

My invention relates to locking means for nuts, bolts and washers and the object of the invention is to provide means for automatically locking a bolt after it has been screwed up tight. I accomplish this object by the mechanism shown in the accompanying drawings, in which:

Figure 1 is a view chiefly in axial section showing a bolt provided with a locking mechanism in the condition it will appear when in service.

Fig. 2 is a sectional view on the line 2—2, Fig. 1, looking in the direction of the arrow. A portion of the cage is broken away to reveal the construction of the inner end of the bolt head.

Fig. 3 is a view chiefly in axial section, showing a lock washer as it appears in use.

Fig. 4 is a sectional view on the line 4—4, Fig. 3, a portion of one of the cages being broken away to better reveal the construction.

Fig. 5 is a view chiefly in axial section showing a nut provided with my locking mechanism.

Fig. 6 is a sectional view on the line 6—6, Fig. 5.

Fig. 7 is a sectional view on the line 7—7, Fig. 5.

Similar numerals refer to similar parts throughout the several views.

Referring first to the locking bolt shown in Figs. 1 and 2, the bolt has a threaded shank 1 having an integral head 2. In order to illustrate the use of the invention, I have shown the bolt as fastening together two elements 3, 4. These may be termed "the work", and may assume various forms. The inner end of the bolt, (that is, the end farthest from the head) screws into an internally threaded element 5 which, in the drawings, is shown in the form of a nut.

Integral with the bolt head there is a body consisting of the annular shoulder 10 separated from the bolt head proper by the annular groove 11. The inner face of this body is perpendicular to the bolt axis and hence parallel to the adjacent face of the work. Inclined raceways 6 are formed in said inner face, these being preferably concentric with the bolt, as best shown in Fig. 2. The raceways pitch in the same direction as the threads on the bolt, but the angle of pitch is steeper. At or near the deep end of these raceways are locking elements 7 which, in the present instance, are shown in the shape of balls but may assume the form of rollers or wedges. These locking elements are retained within the raceways by a cage 8 which is rotatable upon the shoulder 10 and has apertures 9 through which the locking elements project far enough to contact the work. These apertures, however, are restricted sufficiently to prevent the locking element from escaping through the cage. The cage is here illustrated in the form of a chambered nut having a hexagonal peripheral surface. Tongues 12 are formed upon the cage by swaging or otherwise and these engage the inner edge of the shoulder 10 and hold the cage in position upon the bolt.

In operation, let it be assumed that the parts are assembled as in Figs. 1 and 2, with the balls at the deep end of the pockets or raceways 6 and subjected to an appreciable, but not locking, pressure between the work and the surface of the raceway. If, now, it is desired to lock the bolt in place, a wrench is applied to the cage and it is rotated slightly in the direction which the bolt would be rotated to tighten it. This rotates the balls slightly away from the deep end of the raceways and wedges them tightly between the work and the bolt head. If the operator exerts ordinary force, the parts will become so firmly locked that it will be impossible to unscrew the bolt. It will be evident that any pressure applied to the bolt head in a direction to unscrew the bolt will simply wedge the balls tighter. The parts will thus remain locked for an indefinite period and the bolt will be held securely in place.

If it is desired to unlock the bolt, pressure must first be applied to the bolt head in a direction tending to screw the bolt up tighter. This has the effect of rolling the balls slightly toward the deeper end of the raceway, and when the bolt head has been thus rotated sufficiently to loosen the parts somewhat, the wrench may be applied to the cage, and force exerted to rotate the cage in a direction to unscrew the bolt. Force should also at the same time be exerted upon the bolt head, and if the parts have been sufficiently loosened, the cage and bolt may be rotated in unison, and the bolt finally removed. The wedging action of the balls is very powerful, and will effectually prevent the parts from becoming unlocked while in service.

The locking washer shown in Figs. 3 and 4 operates upon the same general principle, but in this case the bolt is plain and the washer provides all the mechanism necessary to hold the bolt in place. In this form, the threaded shank 1 has a head 2 at one end and the pieces of work 3 and 4 are held adjacent to the nut 5. The washer has an annular body with annular shoulders 15, 16 at the two ends, separated by an annular groove 17. Raceways 18 are formed in the two opposite ends or faces of the washer body, and these receive the locking element or balls 19, as in the previous form. The balls are held in position by cages 20 which are preferably formed of sheet metal and retain the balls in the same manner as does cage 8. These cages 20 have inwardly projecting flanges 21 which engage the shoulders 15, 16 of the body of the washer, and hold the cages assembled, and at the same time permit them to rotate relatively to the body.

In operation, when the parts are screwed up tight, the bolt becomes securely locked, for any tendency to rotate in a negative direction causes the balls to tend to roll toward the shallow end of the raceways and hence causes them to become firmly wedged between the adjacent parts.

In the form shown in Figs. 5, 6 and 7 the mechanism is applied to the nut. In this case the bolt has a screw threaded shank 30 provided with an ordinary head 31. The work or parts to be held together are typified by the elements 3 and 4, as before. The nut 32 has a shoulder 33 separated from the body of the nut by the annular groove 34, these parts corresponding in construction and function to the parts 10 and 11 respectively, previously mentioned. The inner face of the nut has inclined raceways 36 like the mentioned raceways 6 and these coöperate with the balls 37. A cage 38 corresponds in construction and function to the cage 8, previously mentioned. The cage is prevented by the tongues 12 from coming off the nut.

In operation, the action is the same as before, the balls and raceways preventing negative rotation of the nut and this, when the nut is screwed up tight, prevents negative rotation of the bolt.

It will be observed that all forms of the invention operate upon the same principle. In the case of the locking bolt, the locking body which contains the raceways is integral with the head of the bolt, and in the case of the locking nut, Figs. 5, 6 and 7, it is in the nut, whereas, in the locking washer it is separate. But in all cases, the body rotates in unison with one of the main threaded parts, for in the case of the locking washer the body must rotate in a negative direction at or about the same speed as the bolt or the balls on the opposite side will not engage the work.

Having thus described my invention, what I claim as new and desire to secure by Letters Patent, is:

1. Mechanism for locking a bolt including a body rotatable in unison with the bolt, said body having a raceway inclined with respect to a plane perpendicular to the axis of the bolt, a locking element in said raceway contacting the work, and means for retaining said locking element in the raceway.

2. Bolt locking means having a body rotatable in unison with the bolt, said body having an inclined raceway the deep end whereof is opposite a different point on the axis than the shallow end is, a locking element in said raceway, adapted to simultaneously engage both it and the work, and a cage for holding the locking element in the raceway.

3. Bolt locking means having a body rotatable in unison with the bolt, said body having an inclined raceway the deeper end whereof is opposite a different point on the axis than the shallow end, a ball in said raceway adapted to simultaneously contact the side of the body and the side of the work, and a cage for holding said ball in the raceway.

4. Bolt locking means having a body, the face whereof lies in the plane transverse to the axis of the bolt, a raceway in said body inclined with respect to the face of the body, a locking ball in said raceway, and a cage rotatably supported upon said body for holding said ball in said raceway.

5. Bolt locking means having a body, the face whereof lies in a plane perpendicular to the axis of the bolt, a raceway in said body inclined with respect to the face thereof, a locking ball in said raceway, and a cage rotatably mounted upon said body, said cage having an aperture for accommodating the ball, whereby the ball may reach through from the raceway to the work.

6. Bolt locking means having a body rotatable in unison with the bolt, the face of the body being perpendicular to the axis of the bolt, a raceway inclined with reference to said face, said raceway when viewed in an axial direction being concentric with the axis of the bolt, a locking element in said raceway adapted to be moved axially when said body is rotated, and a cage rotatable upon said body, said cage having an aperture through which the locking means extend to engage the work.

7. Bolt locking means having a body rotatable in unison with the bolt, said body having an annular shoulder concentric with the axis of the bolt, the face of the body being perpendicular to the axis of the bolt, a raceway the length whereof is circular and concentric with the bolt, said raceway being deeper at one end than the other, a ball in said raceway, a cage rotatably mounted upon said annular shoulder and having means for engaging the inside of the shoulder to prevent the cage from coming off the body, said cage being adapted to retain the ball in the raceway, and said cage being apertured to permit the ball to reach through to the face of the work perpendicular to the axis of the bolt.

8. Bolt locking means having a body rotatable in unison with the bolt, said body having a raceway with a pitch progressing in the same direction as the pitch of the thread of the bolt, but the angle of pitch of the raceway being greater than the pitch of the thread, a locking element working in said raceway and adapted to engage the face of the work, and means for retaining said locking element in the raceway.

9. Bolt locking means having a body integral with the head of the bolt, said body having an annular shoulder and having a face perpendicular to the axis of the bolt, a raceway sunk in said face, said raceway being substantially concentric with the bolt and having a pitch running in the same direction but at a steeper angle than the thread of the bolt, a locking ball in said raceway, and a cage bearing on the annular shoulder and engaging the inner end of the shoulder to keep the cage in position upon the bolt head, said cage having an opening to loosely accommodate the shank of the bolt and said cage lying chiefly between said face and the work and having an aperture through which the ball may gain access to the work.

In witness whereof, I have hereunto subscribed my name.

CHARLES H. TURBETT.

Copies of this patent may be obtained for five cents each, by addressing the "Commissioner of Patents, Washington, D. C."